United States Patent [19]
Neuhard et al.

[11] Patent Number: 5,394,539
[45] Date of Patent: Feb. 28, 1995

[54] METHOD AND APPARATUS FOR RAPID DATA COPYING USING REASSIGNED BACKING PAGES

[75] Inventors: Deborah E. Neuhard, Poughkeepsie; Jeffrey M. Nick, Fishkill; Danny R. Sutherland, Poughkeepsie, all of N.Y.

[73] Assignee: International Business Machines Corporation, Armonk, N.Y.

[21] Appl. No.: 276,512

[22] Filed: Jul. 15, 1994

Related U.S. Application Data

[63] Continuation of Ser. No. 754,816, Sep. 4, 1991, abandoned.

[51] Int. Cl.6 .................... G06F 12/00; G06F 13/00
[52] U.S. Cl. .................... 395/425; 395/600; 364/DIG. 1
[58] Field of Search .................. 395/425, 600, 400

[56] References Cited

U.S. PATENT DOCUMENTS

| | | | |
|---|---|---|---|
| 4,084,231 | 9/1978 | Capozzi et al. | 395/425 |
| 4,356,549 | 10/1982 | Chueh | 395/400 |
| 4,476,524 | 10/1984 | Brown et al. | 395/425 |
| 4,530,054 | 7/1985 | Hamstra et al. | 395/425 |
| 5,237,668 | 8/1993 | Blandy et al. | 395/400 |

OTHER PUBLICATIONS

IBM MVS/ESA Application Guide GC28-1821-3, Dec. 1990.
IBM Enterprise Systems Architecture/370 Principles of Operation SA22-7200-0, Aug., 1988.

*Primary Examiner*—Glenn Gossage
*Attorney, Agent, or Firm*—William B. Porter; Peter L. Michaelson; JoAnn K. Crockatt

[57] ABSTRACT

A data processing system, having virtual addressing capability, has a real storage manager to associate virtual storage locations with real storage by accessing page tables to determine the locations of "backed" virtual storage pages in central, expanded, or auxiliary storage. The real storage manager accepts requests to copy ranges of virtual storage from one virtual storage range to another, and, in so doing, uses the page tables to effectively perform the copying by reassigning backed pages from the source range to the target range. Having been reassigned to the target range, the backed pages are artificially aged by increasing the unreferenced interval count (UIC), so that the backed pages in the target range will be likely candidates for page stealing.

20 Claims, 6 Drawing Sheets

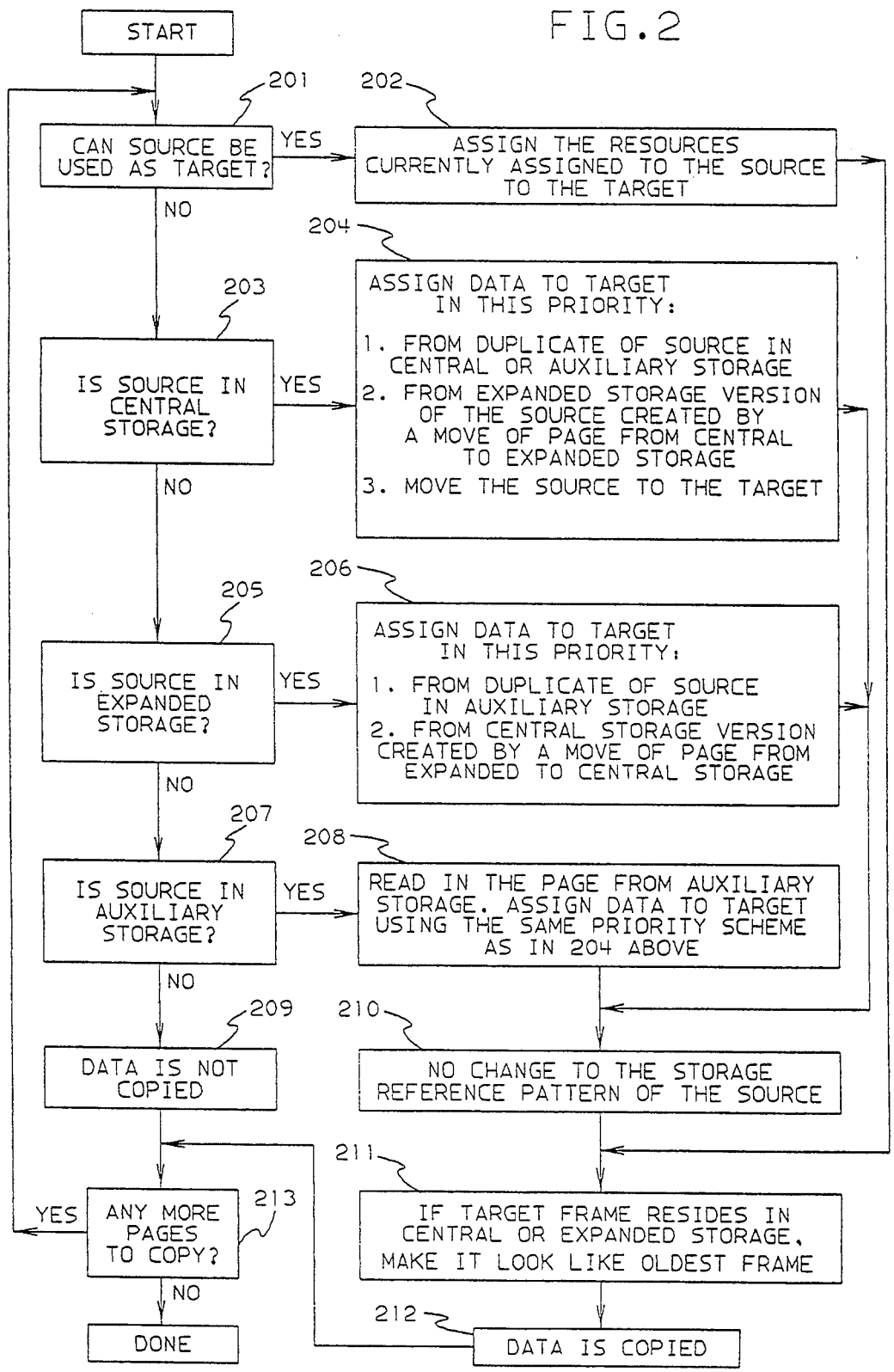

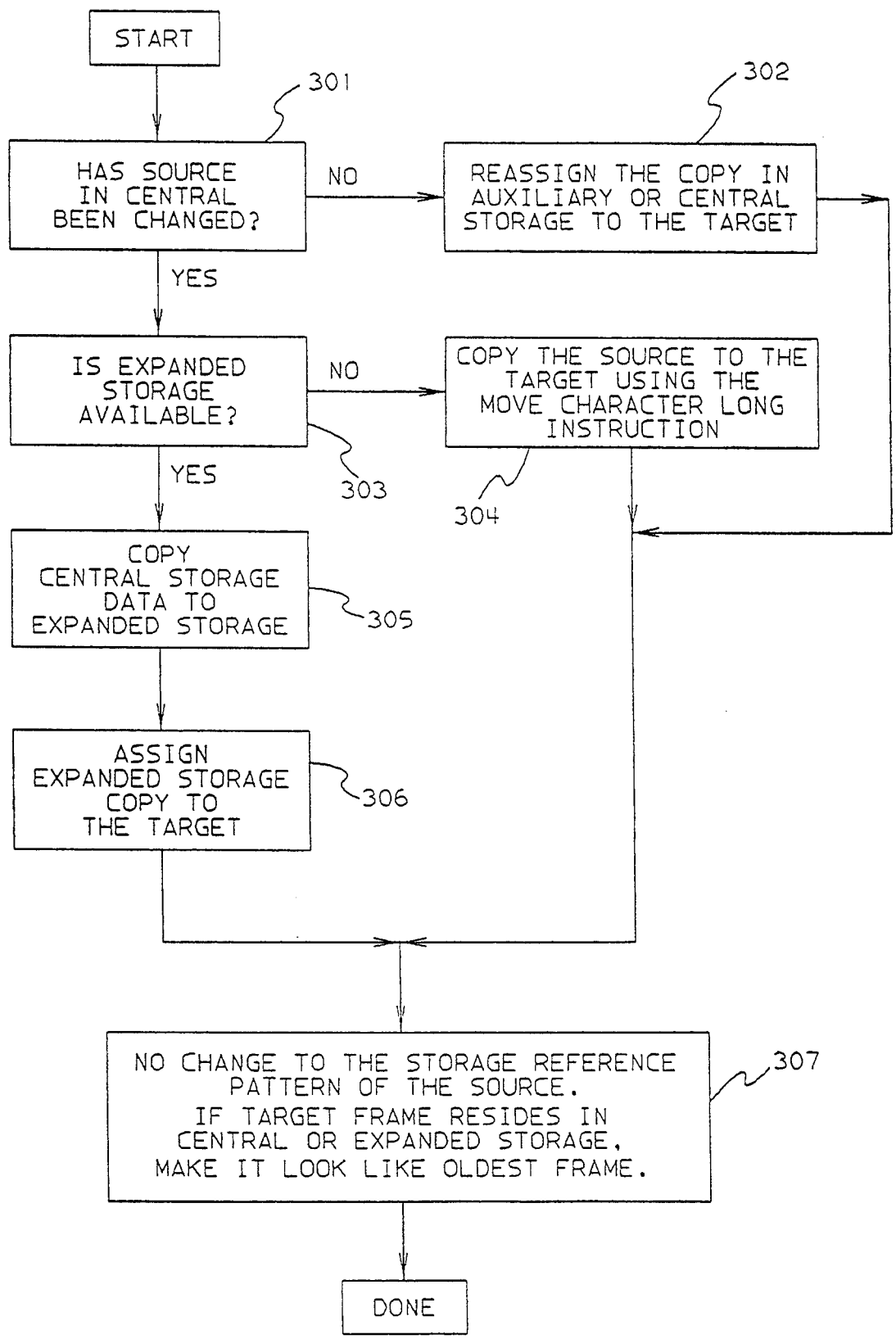

|  | BEFORE RSMCOPY | | | AFTER RSMCOPY | | |
| --- | --- | --- | --- | --- | --- | --- |
| FRAME ID | OWNER | REF IND | UIC VALUE | OWNER | REF IND | UIC VALUE |
| C1 | FREE | — | — | T4 | OFF | 14  701 |
| C2 | S3 | ON | 0 | S3 | ON | 0  702 |
| C3 | S1 | OFF | 9 | S1 | OFF | 9 |
| C4 | FREE | — | — | T3 | OFF | 14  703 |
| C5 | S2 | OFF | 3 | S2 | OFF | 3  704 |
| C6 | X1 | ON | 0 | X1 | ON | 0 |
| C7 | Y4 | OFF | 1 | Y4 | OFF | 1  705 |
| C8 | Z8 | ON | 0 | Z8 | ON | 0 |

NOTE: THE HIGHEST VALUE FOR UIC DURING THE RSMCOPY IS 14

METHOD AND APPARATUS FOR RAPID DATA COPYING USING REASSIGNED BACKING PAGES

CROSS REFERENCE TO RELATED APPLICATION

This application is a continuation of patent application Ser. No. 07/754,816, entitled "Method and Apparatus for Rapid Data Copying", filed on Sep. 4, 1991, now abandoned.

BACKGROUND OF THE INVENTION

1. Field of the Invention

This invention relates to data processing systems having virtual storage support, and real storage managers for managing real storage for use within the virtual storage support of the data processing system. More particularly, this invention describes a mechanism for having the system's real storage manager provide a data copy service.

2. Background Art

When programs which execute on virtual storage systems such as International Business Machine's (IBM's) System/390 need to copy data from one location in byte addressable storage (the source) to another location in byte addressable storage (the target), they reference the source and target data by their addresses which are subsequently transformed into "from" and "to" operands by machine architected instructions like move character (MVC) and move character long (MVCL).

In accordance with ordinary use, the word "target" in the present description generally pertains to a storage location to which data is written, while "source" pertains to a storage location which contains data to be written to a destination such as a target. In some areas of this description, these storage locations are also referred to as "target frames" and "source frames." The word "frame" is generally used here, as it is used in the literature, to refer to a fixed-size portion of storage in which data is stored.

Additionally, the terms "target data" and "source data" refer to the data written to the target (or target frame) and the data contained in the source (or source frame), respectively. In some cases, "target data" is referred to as a "target page" and "source data" is referred to as a "source page." The word "page," in one context, refers to a fixed-length block of data that has a virtual address and is transferred as a unit between storage. In another context, the terms "page" and "page frame" are used interchangeably to refer to a storage location having the size of a page.

When such a program executes in the environment of an operating system such as IBM's Multiple Virtual Storage-Enterprise Systems Architecture (MVS/ESA), references to byte addressable storage are resolved by a processor storage manager such as MVS/ESA's Real Storage Manager (RSM). Processor storage includes central storage, (which contains real storage) and expanded storage and is managed by RSM. RSM performs many tasks when allocating and managing the processor storage for the active units-of-work (e.g. programs) in the system, and one of those tasks is to ensure that data needed by the currently executing units-of-work reside in central storage. When a unit-of-work is copying data with instructions like the MVCL, the hardware and/or microcode support for the MVCL require that the operands reside in central storage. If the operands do not reside in central storage, page faults occur and this triggers the intervention by the RSM. It is the RSM's responsibility to intercept requests for data that is not resident in central storage and to ensure that:

1. Central storage is assigned to the source and target (i.e., pages in the central storage are reserved for the source and target),
2. The most up-to-date version of the source data resides in the central storage pages that are reserved for the source.

This can entail the need for Paging input/output (I/O) to read the source data from the auxiliary storage devices that contain the paging data. Or, it may entail the need to move the source data from expanded storage to central storage.

For either action, the RSM adjusts the storage reference pattern to indicate that the storage assigned to the source and target is the most recently referenced storage and is therefore the last storage to get reclaimed and reassigned to future demands for central storage.

The inefficiencies of the MVCL logic are not that noticeable when copying relatively small amounts of data. But when massive amounts of data (measured in megabytes) are copied, then the effect of the inefficiencies is noticeable. The supervisor call (SVC) Dump service of the IBM operating system Multiple Virtual Storage (MVS) is an example of a function that copies a large amount of data to its own data spaces.

This MVCL technique impacts the storage resources of the system, resulting in system performance degradation. It can result in page faults on both the source and target pages and increases the demand for central storage (real storage) to hold the copied pages. As a general rule in migrating data from central storage and in reassigning pages of central storage to meet the demands of currently active work (a process called page stealing), the RSM supports the least recently used (LRU) concept as the most appropriate predictor of storage references. Therefore, in responding to an MVCL instruction for large amounts of data, the RSM may be forced (or "migrate" off) the pages of data located in central storage, which are assigned to the units-of-work which were active at the time of the SVC Dump request, and then assign those pages to target data from the MVCL. But the replaced or migrated pages are likely to be referenced immediately once the copying process is complete, causing yet more paging activity. This can significantly affect the performance of the entire system, including units-of-work which are not associated with the MVCL issuer, since pages may be stolen from those units-of-work to accommodate the data copying. The effects may be visible long after the MVCL form of copy is completed.

The SVC Dump service normally uses MVCL logic to create its own copy of dump data. This method causes two copies of the dump data, the source and the target, to reside in central storage at the time the copy is made. This greatly increases the demand on central storage when a dump was being taken. In storage constrained environments this can severely impact system processing. It also disrupts the normal storage reference patterns, since the data referenced by SVC Dump (both the source and target data) looks like the most recently referenced data in the system. Units of work that are completely independent of and not involved with the unit-of-work that requested the SVC Dump, are impacted since their data may have been migrated to slower access storage. The target data look like the most recently referenced data, and are not likely to be accessed when the copying is completed. The target data instead are referenced after some time by the "I/O to the Dump Dataset" phase of SVC Dump.

The preferred effect on central storage and storage reference patterns as a result of copying data for inclusion in a dump, is to have the storage reference pattern of the source be unchanged by the copy action, to have the minimally necessary growth in central storage consumption, and to have the central storage pages which are assigned to the target data be tagged as the primary candidates for the next page stealing process.

Therefore, it is an object of this invention to provide a fast copy mechanism that avoids the overhead of page fault processing when the source and/or the target are not resident in central storage.

It is a further object of this invention to provide a fast copy mechanism that minimizes the consumption of central storage resources by the target data with the additional ability for the central storage pages that are assigned to the target to become the primary candidates for migration to slower access storage.

It is a further object of this invention to provide a fast copy mechanism in which the storage reference patterns of the source data remain unchanged by the copy process.

SUMMARY OF THE INVENTION

This invention comprises a data copying mechanism which is provided by a Real Storage Manager (RSM) component of the Operating System and can thus copy data in a very efficient manner with minimal impact to system resources. It minimizes the demand on the processor storage resources while copying this data. This data copying mechanism (or copy service) makes use of the RSM's knowledge of the location and state of all copies of a page, as well as its ability to manipulate central and expanded storage directly.

Functions requiring rapid data copying (such as SVC Dump) can use this invention to create the copy of the dump data. This service creates the copy quickly and efficiently with minimal impact to processor storage.

When a requestor invokes this copy service to copy a range of data from a virtual range in a first address space to a range in a second address space, the copy service analyzes page table entries to determine where backing pages exist. Backing pages means those pages which contain the data for virtual pages in the range of data. The copy service reassigns the backing pages to the target range when possible, and artificially "ages" the reassigned pages by manipulating the unreferenced internal count (UIC) associated with pages, so that the target page will be a candidate for page stealing. It also leaves unaffected the previously existing page UIC associated with the source range.

This data copying mechanism, termed RSMCOPY, provides a fast, efficient means of copying data.

1. It exploits the RSM's knowledge of duplicate copies of data and reduces the need for data movement in the copy process.

In addition to avoiding multiple copies in central storage (unlike MVCL), RSMCOPY is also able to determine if duplicate copies of a page already exist, and selects one of them as the target copy of the page.

2. It minimizes the demand on processor storage.

RSMCOPY is able to determine if sufficient expanded storage exists to put the target data there, rather than make a duplicate copy in central storage. For situations where RSMCOPY must make a duplicate copy of the data in central storage, RSMCOPY is able to write (off-load) that copy of the data to auxiliary storage immediately.

3. It avoids upsetting storage reference patterns in the system.

RSMCOPY ensures that the storage reference patterns of the source data reflect the "reference status" prior to the copy request. Since RSMCOPY is controlling the copying of data, RSMCOPY is able to free up resources as soon as copying of each page is done. RSMCOPY is also able to make copied data look "older" in storage than data that is in processor storage when the copy request is issued.

4. It provides the caller (the requestor who invoked the copy service) with the choice of either a nondestructive or a destructive copy of the source data.

RSMCOPY guarantees a nondestructive process for the source data. At the completion of the copy request, the source data resides on an equivalent or faster access storage than when the copy request was issued. In addition the caller can override the nondestructive copy by explicitly requesting that the RSMCOPY use the resources currently assigned to the source and reassign assign them to the target (a destructive copy).

BRIEF DESCRIPTION OF THE DRAWINGS

FIG. 2 is an illustration of an invocation of RSMCOPY's processing for one address range of source data.

FIG. 3 is an illustration of the RSMCOPY process when a source page resides in central storage.

DESCRIPTION OF THE PREFERRED EMBODIMENT

Overview

This invention consists of a data copying mechanism, provided by the Real Storage Manager (RSM) component of the MVS Operating System. It copies data in a very efficient manner while minimizing the demand on the processor storage resources. This mechanism (or service) makes use of the RSM's knowledge of the location and state of all copies of a page, as well as its ability to manipulate central and expanded storage directly, to make copies of data in a very efficient manner.

It avoids creating new copies of a page in storage. It determines if duplicate copies of the page already exist and actually uses one of them as the target's copy. This eliminates the need to actually move a page of data in order to obtain a copy of it. This is possible since RSM manages the page tables and external page tables. These resources together contain the information needed to determine all possible locations of a page. In addition, RSMCOPY is able to copy data in many cases using only a single frame (a 4096 byte area) of central storage, rather than the two frames that would be required to copy the pages using MVCL. This is possible since the RSM can manipulate central and expanded storage directly. Since RSMCOPY is controlling the copying of data, RSMCOPY frees resources as soon as possible. This is accomplished by making copied data appear to be "older" in storage than data that was in processor storage at the time of the copy request. This is known as artificially aging the data.

Figure 1A:
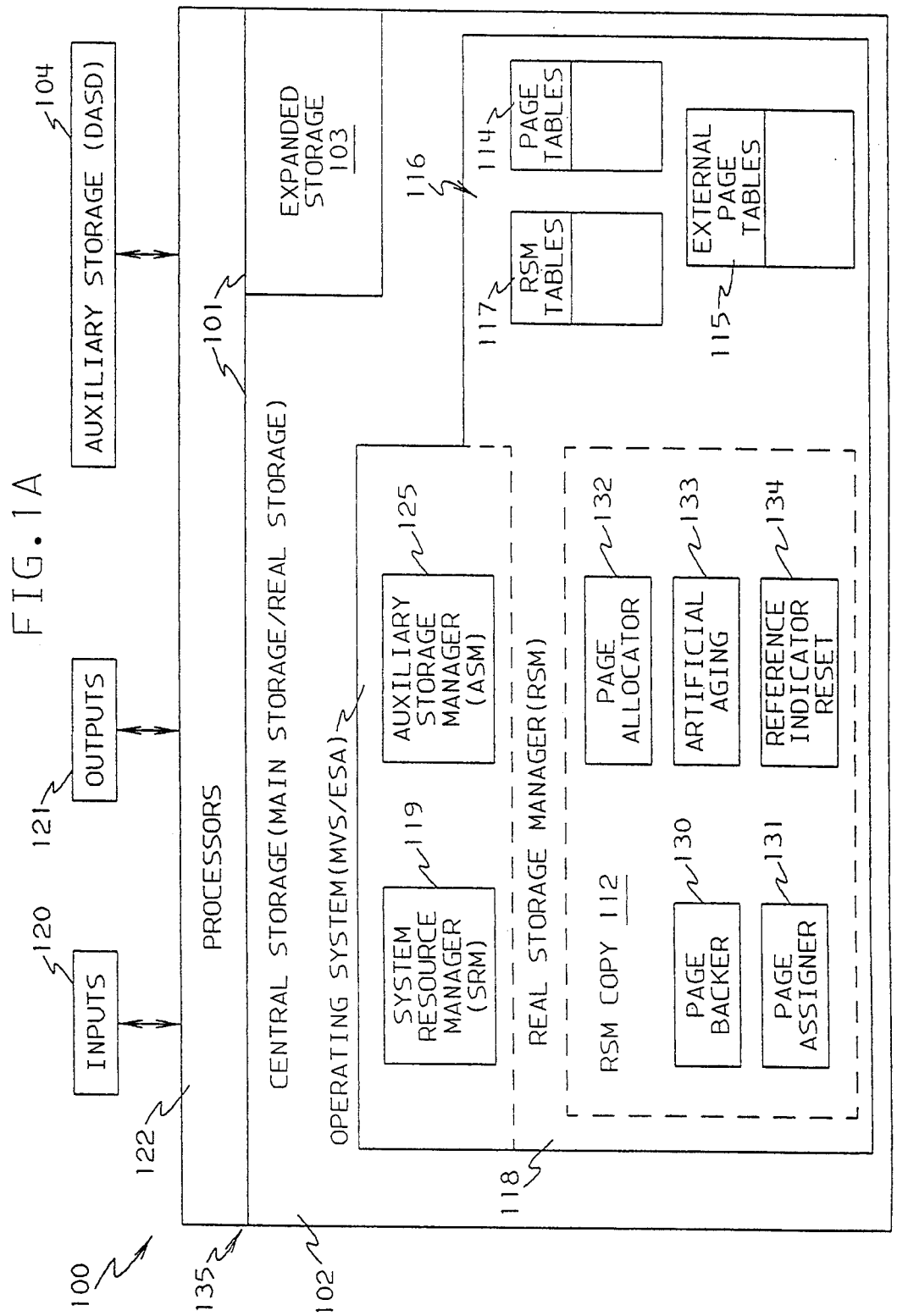
FIG. 1A is a schematic diagram of a preferred embodiment of a data processing system in accordance with the present invention.

FIG. 1A shows a data processing system 100 which has conventional inputs 120 and outputs 121 connected to typical processors 122 of a standard virtual storage processor system 135. As such, processor system 135 includes processor storage 101 comprised of central storage 102 and expanded storage 103. Auxiliary storage 104, which typically contains standard direct access storage devices (DASD), connects to processors 122. In general, the combination of inputs 120, outputs 121, virtual storage processor system 135 and auxiliary storage 104 is conventional and may be found in IBM's System/390, referenced above.

Processor storage 101 and auxiliary storage 104 are available to be used for virtual storage under the control of a virtual storage operating system, such as IBM's MVS/ESA which is found in IBM's System/390. In accordance with conventional use, central storage 102 represents storage that is an integral part of processor system 135 and includes both main storage and the usual hardware system area (not shown). However, in a virtual storage system, as described herein, main storage is usually referred to as real storage.

As shown in FIG. 1A, the operating system, when activated, primarily resides in processor storage 101. In addition to other units which are not important here, the operating system includes system resource manager (SRM) 119, auxiliary storage manager (ASM) 125 and real storage manager (RSM) 118. RSM 118 includes a network of control blocks 116 comprised of conventional data tables, viz., RSM tables 117, page tables 114 and external page tables 115. In a manner that is standard for virtual storage systems, RSM tables 117, page tables 114 and external page tables 115 hold information for identifying the physical location of virtual pages and specifying which virtual page occupies each physical storage location.

RSM 118 further includes RSM copy 112 which is comprised of means for copying a source range of data pages to a target range of data pages in accordance with a technique described below with respect to FIGS. 2–7. Specifically, RSM copy 112 includes the following: page backer 130, which is a means for backing source data pages; page assigner 131, which is a means for assigning or reassigning backing pages within a source range of data pages to a target range of data pages using information contained in the tables of the network of control blocks 116; page allocator 132, which is a means for assigning storage space; artificial aging 133, which artificially ages stored data; and reference indicator reset 134, which is a means for resetting a reference indicator (reset 134 is used during copying as a means for preventing the copying from changing a reference indicator associated with any one or more of the source data pages).

Figure 1B:
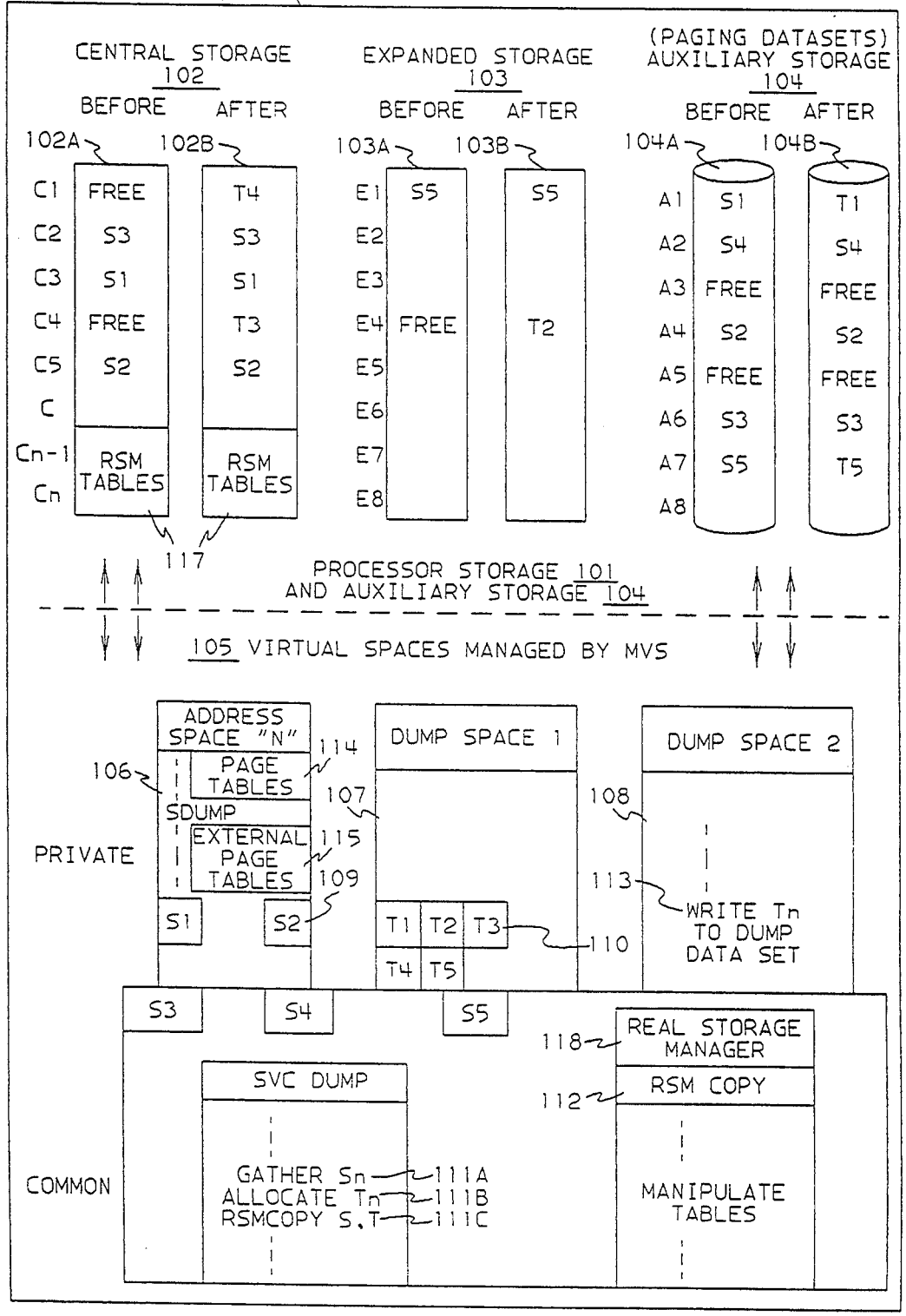
FIG. 1B is a diagram illustrating the environment when SVC Dump issues an RSMCOPY request and shows a sample mapping of central storage, expanded storage, and auxiliary storage before and after the RSMCOPY process.

FIG. 1B gives an overview of the environment and the effect of an RSMCOPY request from the MVS SVC Dump service.

The process begins in a unit of work in the initiated address space 106 where an SVC Dump is requested via a macro called SDUMPX. This causes SVC Dump to get control.

SVC Dump performs three activities on behalf of its caller. It gathers the addresses and some of the source data that is to be captured (111A). It allocates in one of its virtual spaces 107, sufficient virtual storage to contain the copied source (111B) (the target pages T1–Tn (where, in the example, no. 110). If necessary, it requests that source pages which reside only on auxiliary storage 104, be loaded into central storage 102. It then issues the RSMCOPY request to have RSM copy 112 the source to the target (111C).

As the manager of processor storage 101, RSM 118 manages the backing of virtual space data in processor storage 101 through the network of control blocks 116 (page tables 114, external page tables 115, frame tables (RSM tables 117) for central and expanded storage). It tracks a page of data as it migrates through the hierarchy of storage media due to use or non-use. When data is needed by the executing unit of work, it must reside in central storage 102A. If central storage resident data has not been referenced for some period of time and another unit of work needs central storage resources, the unreferenced data is migrated to either expanded storage 103A from where it can be retrieved without the overhead of paging I/O; or it can be written via I/O to auxiliary storage (the paging datasets 104A) where the overhead of another paging I/O is needed to retrieve it. Processor storage 101 includes central storage 102 and expanded storage 102 and is managed by RSM 118. RSM manages the auxiliary storage status of a page after it has been allocated by the auxiliary storage manager (ASM) 125. RSM 118 knows whether a page of data is backed in auxiliary storage 104 and whether that page is the same or a prior version of the central storage version of the data.

Virtual space 105 does not exist as physical storage media like processor storage 101. Underneath the concept of contiguous virtual storage frames is a set of discontinuous frames on processor and auxiliary storage. The resolution of a reference to a virtual address to data residing on central storage 102 is resolved by the RSM 118 and the auxiliary storage manager (ASM) 125. When SVC Dump in the initiated address space issues the RSMCOPY request to copy source pages S1–S5 to the target pages T1–T5, the residency of the source pages is shown in blocks 102A, 103A, and 104A.

Using its network of control blocks 116, RSMCOPY sees how the source pages are distributed across processor and auxiliary storage in blocks 102A, 103A, and 104A. It then determines where duplicate copies exist and if the copy can be assigned to the target address without causing a reference to central storage 102. The completion of the RSMCOPY process is shown in the "after" version of the three storage media in blocks 102B, 103B and 104B. The rationale behind the reassignments of source frames is explained later in this patent specification in the "Example" section.

At some time after the completion of the RSMCOPY and the copy phase of SVC Dump, a unit-of-work in the second SVC Dump address space 108 begins to execute and does the I/O phase of the SVC Dump processing. This writes the target data to the Dump Dataset on a direct access storage device (DASD) (113).

The RSM 118 manages a network of control blocks/tables 116 to track the migration of a page of data and its copies through the hierarchy of storage media. RSMCOPY uses prior art controls that are defined within those control blocks/tables (page table, external page table, page frame table, extended store table) to achieve the desired effects of a copy without the overhead and central storage consumption effects of the MVCL instruction. With this invention, RSMCOPY is using these key control fields from the prior art in a different manner from the prior art to circumvent the shortcomings of the MVCL logic but still achieve an equivalent effect of the source being copied to the target.

1. Invalid and Valid Bits

When "ON" the "invalid on central" bit implies that the page no longer resides in central storage. When "ON", the "valid on expanded" bit implies that the page resides in expanded storage. When "ON", the "valid on auxiliary" bit implies that the page resides in auxiliary storage 104.

2. Reference Bit (reference indicator)

This is a sub field of a storage protect key and when "ON" indicates that the page in processor storage was referenced during the most recent update interval.

3. Unreferenced Interval Count (UIC)

The UIC indicates the number of update intervals during which the page has not been referenced. The update interval polling cycles are driven by the SRM 119 (System Resource Manager function of MVS). A high UIC makes a page a good candidate for migration to slower storage when processor storage frames are in short supply.

4. Changed Bit

This is a sub field of the storage protect key and when "ON" indicates that the page in processor storage 101 has been changed since it was last loaded (or read) from auxiliary storage 104 (the paging datasets).

5. Location of page

When a page is backed on processor storage 101, this field contains an identifier of the page/frame in processor storage that it occupies.

These controls may be applicable to both forms of processor storage (central and expanded). The context in which they are used in the following discussion determines which form.

The controls exist in the prior art and are documented in the following IBM publications.

1. The invalid bit and the changed bit are described in the IBM ESA/370 Principles of Operation Manual form SA22-7200.
2. The UIC is defined in the MVS/ESA System Programming Library: Initialization and Tuning, form number GC28-1821.

Detail—RSMCOPY

FIG. 2 describes how the RSMCOPY service processes a range (block 213) of source data. The RSMCOPY service processes the range of source data a page at a time. Block 213 of FIG. 2 functions to loop the process back to the beginning (START) after each page is processed or to exit (DONE) when the complete range of pages is processed.

Input to the RSMCOPY data copy mechanism includes:

1. The specification of the address range to be copied.
   a. The virtual storage addresses of the source pages to copy (may optionally be a central storage address for special cases).
   b. The virtual storage addresses of the target pages to receive the data.
2. Three attributes applicable to the range of addresses discussed above.
   a. An indication of whether the caller of the service caused the source pages to be loaded into central storage.
      The RSMCOPY can't possibly know this. It is dependent on the caller to provide this indication.
   b. An indication of whether the service should use the resources currently assigned to the source page as the target page (blocks 201 and 202) (destructive copy).
   c. An indication of whether the source address is specified as a central storage address or a virtual address.
      This option is used by callers who need to copy data whose location is known only via its central storage address.
3. The address of an array of storage protect keys where RSMCOPY records as output to the caller, the storage protect keys of the pages that are copied.

If the source page is specified as a virtual storage address, the page table for the page is examined to determine if the page is in central storage. If the RSM copy data mechanism indicates that the specified source page is a central storage address or the "invalid on central" bit is off, the source page is assumed to be in central storage (block 203).

When the source resides in central storage, RSMCOPY assigns a copy of the source to the target in the priority sequence described in block 204. This process is described in detail in FIG. 3.

The rationale for the stated priority sequence is to try to assign one of two existing copies of the source to the target with the intent to minimize the number of references/allocations to central storage.

First preference is no reference/allocation to central storage (block 204, step 1 and block 206, step 1).

Second preference is one reference/allocation to central,storage (block 204, step 2 and block 206, step 2).

The last preferred situation is where two references-/allocations to central storage are necessary (block 204, step 3). This is the MVCL logic.

The re-assignment process is done by modifying the page table of the source to no longer contain the location of the copy of the source. That is given to the target by updating the page tables for the target to contain the location of the copy of the "stolen" source.

The external page table is examined to determine if a copy of the source page exists in expanded storage (block 205). This is a test of the "valid on expanded bit" in the external page table. If the bit is off, the page is no longer valid and can't be referenced when making a copy for the target.

When the source resides in expanded storage, RSMCOPY assigns a copy of the source to the target in the priority sequence described in block 206. This process is described in detail in FIG. 4.

The external page table is examined to determine if a copy of the source page exists in auxiliary storage (block 207). The "valid on auxiliary" bit when "ON" indicates that such a copy exists.

If a copy of the source page exists in auxiliary storage, then a central storage frame is allocated to the source page through an existing internal RSM service called GETFRAME, and paging I/O is performed to bring the page into that central storage frame. This process is suspended until the paging I/O is completed (block 208). Once the paging I/O completes, the source page is in central storage and is processed as in block 204 above. This process in effect creates a second copy of the source that resides in central storage, the same environment that exists in block 204, step 1 above. The most probable result of going through that process at 204 is that the target gets assigned the copy that exists on auxiliary storage.

If no copy of the page can be found in either central storage, expanded storage, or auxiliary storage, a copy is not performed (block 209). This result is posted in the output to the caller. More specifically, it is noted in a key table that the caller provides when requesting RSMCOPY. The caller examines the return and reason codes to determine if source pages could not be copied. When a source page is not successfully copied, the nature of Return Code in general purpose register 15 is greater than zero and the Reason Code is located in general purpose register 0 (zero).

For SVC Dump this is an expected condition in the situation where callers of SVC Dump specify the dumping of source data that no longer exists. (The virtual storage for the data could have been deallocated via an existing internal RSM service called FREEMAIN). SVC DUMP recognizes the "data not copied" condition and leaves empty pages in the target space. The "I/O phase of the SVC Dump" recognizes the empty target space and does not write it to the dump data set.

If a reference to the source page in central storage is required to make the copy, the reference bit in the storage protect key is reset to reflect its status before the RSMCOPY is issued. All of this processing is performed so as to minimize the impact of the copy process on the storage reference patterns existent in the system at the time the copy is requested (block 210).

Figures 6, 7:
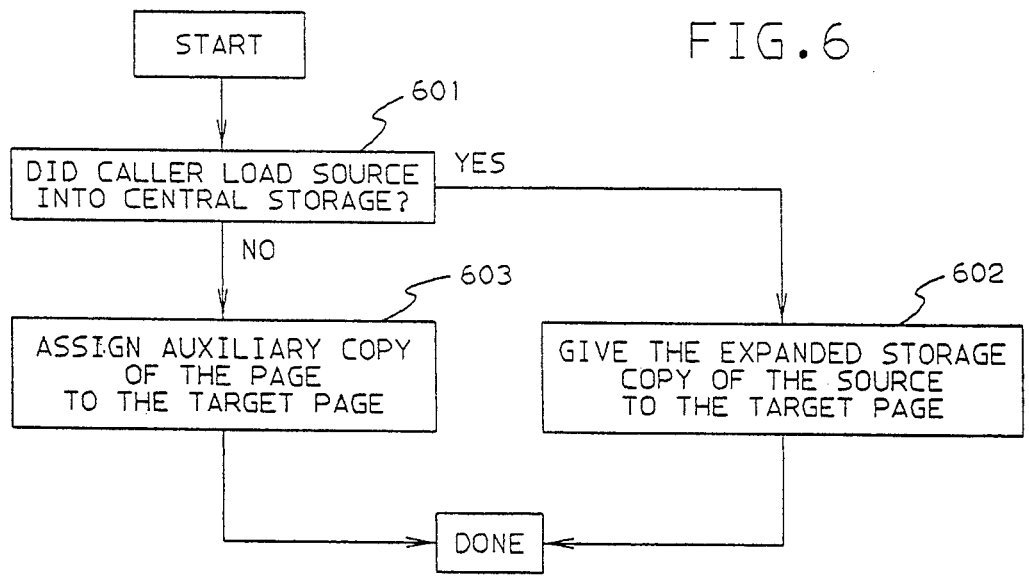
FIG. 6 is an illustration of the process of assigning a duplicate copy of a source page to the target page when the source page exists in expanded storage.
FIG. 7 is an illustration of the results of the process that artificially ages target pages residing in central storage, and that maintains the reference patterns of the source data as they were when the RSMCOPY request was issued.

FIG. 7 is an example of the results of this process for central storage pages. It assumes the control field values as described in Table 1 below. The reference bit and the UIC value (described below) for source pages S3, S1, and S2 are not changed by the RSMCOPY process (blocks 702 and 704). This is the same result as that experienced by pages X1, Y4, and Z8 which were not involved in the copy and still reflect the same reference bit and UIC status after the copy (block 705).

Upon completion of the copy process, if the target page is in either central storage or expanded storage, the target page is made to look like the oldest frame in the system, so that it is one of the first pages stolen if the demand for storage dictates that additional storage frames are needed (block 211 in FIG. 2). The artificial aging process is achieved by manipulating both the reference bit in the storage protect key and setting the UIC (unreferenced interval count) high for these pages. RSM uses this UIC to manage storage on a least recently used basis. Those pages with a high UIC of value "n" are those that have not been referenced for "n" polling cycles where the length and frequency of the polling cycle of referenced pages is an SRM (System Resource Manager) driven value. Those pages with a high UIC such as the target copy of pages, are more likely to be stolen from central or expanded storage before pages with a lower UIC (pages in storage at the time of the copy request). FIG. 7 is an example of this process for central storage pages. It assumes the control field settings as described in Table 1. The pages that are assigned to target pages T4 and T3 both have the reference bit set off to indicate no references and the highest possible UIC value of 14 in the UIC fields (block 701 or 703).

If the caller of the copy service indicates via input parameters that the resources currently assigned to the source page could be taken as the target, then those resources are reassigned to the target and the source pages are then treated as having no data (block 201 in FIG. 2).

In this case, RSMCOPY takes resources backing the source page and backs the target page with them. If the source page is in central storage at the time of the request, then, depending on the dynamically changing demand for central storage, RSMCOPY can either leave the page in central storage (marked as very old) or (if the page is changed) send the page out to paging space. If sending the page to paging space, RSMCOPY can either page it out to expanded storage (based on demand for expanded storage page space) or page it out to auxiliary storage. If the page is unchanged in central storage, then, based on the demand for central storage, RSMCOPY may decide to free up the central storage, using the auxiliary storage copy of the page as the target (block 202). After the data is either copied (block 212) or not copied (block 209), the process, via block 213, loops back to block 201 if more pages are to be copied or exits to DONE if no more pages are to be copied.

Copy Process When Source Resides in Central Storage

FIG. 3 describes this process.

If the source page is specified as a virtual storage address and is unchanged in central storage (determined by examining the change bit in the storage protect key (block 301)), then either the central storage copy or the auxiliary storage copy of the page is assigned to the target. If the auxiliary storage copy of the page is assigned to the target, then the central storage copy of the source is marked as changed (block 302).

Figure 5:
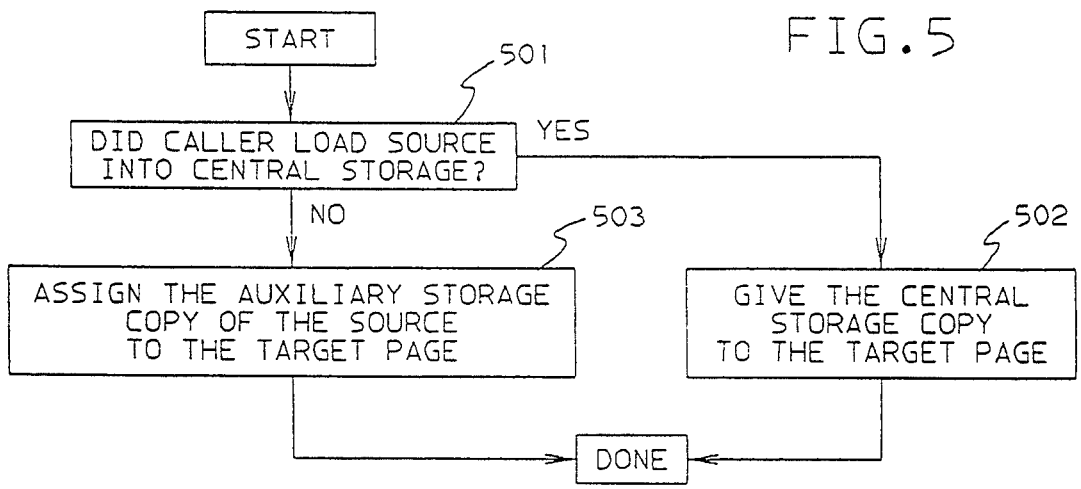
FIG. 5 is an illustration of the process of assigning a duplicate copy of a source page to the target page when the source page exists in central storage.

FIG. 5 describes the above process in block 302 in more detail.

If the caller loaded the source into central storage (block 501), then the target is given the central storage copy by updating the page tables of the target page. The page tables for the source page are updated to indicate the page is no longer in central storage, leaving the auxiliary storage copy as the only copy of the source page (block 502).

If the caller did not load the source into central storage, then the central storage copy is preserved as the source page but it is marked as changed. The auxiliary storage copy of the source page is assigned to the target page by updating the external page table for the target page (giving it the auxiliary copy), and updating the external page table for the source page (removing the auxiliary storage copy) (block 503).

If the source page is specified as a central storage address or is changed in central storage (determined by examining the change bit in the storage protect key (block 301 in FIG. 3)), and if expanded storage is available, then the PGOUT instruction is issued to copy the central storage contents of the source page to expanded storage. The expanded storage copy is assigned to the target page, by updating the external page table for the target page to represent that location on expanded storage (block 305 in FIG. 3).

If the source page is specified as a central storage address or is changed in central storage (determined by examining the change bit in the storage protect key (block 301 in FIG. 3)), but no expanded storage is available to contain a copy of the page, then a central storage frame is allocated for the target page and the data from the source page is copied to the target (via the MVCL instruction (block 304 in FIG. 3).

Copy Process When Source Resides in Expanded Storage

Figure 4:
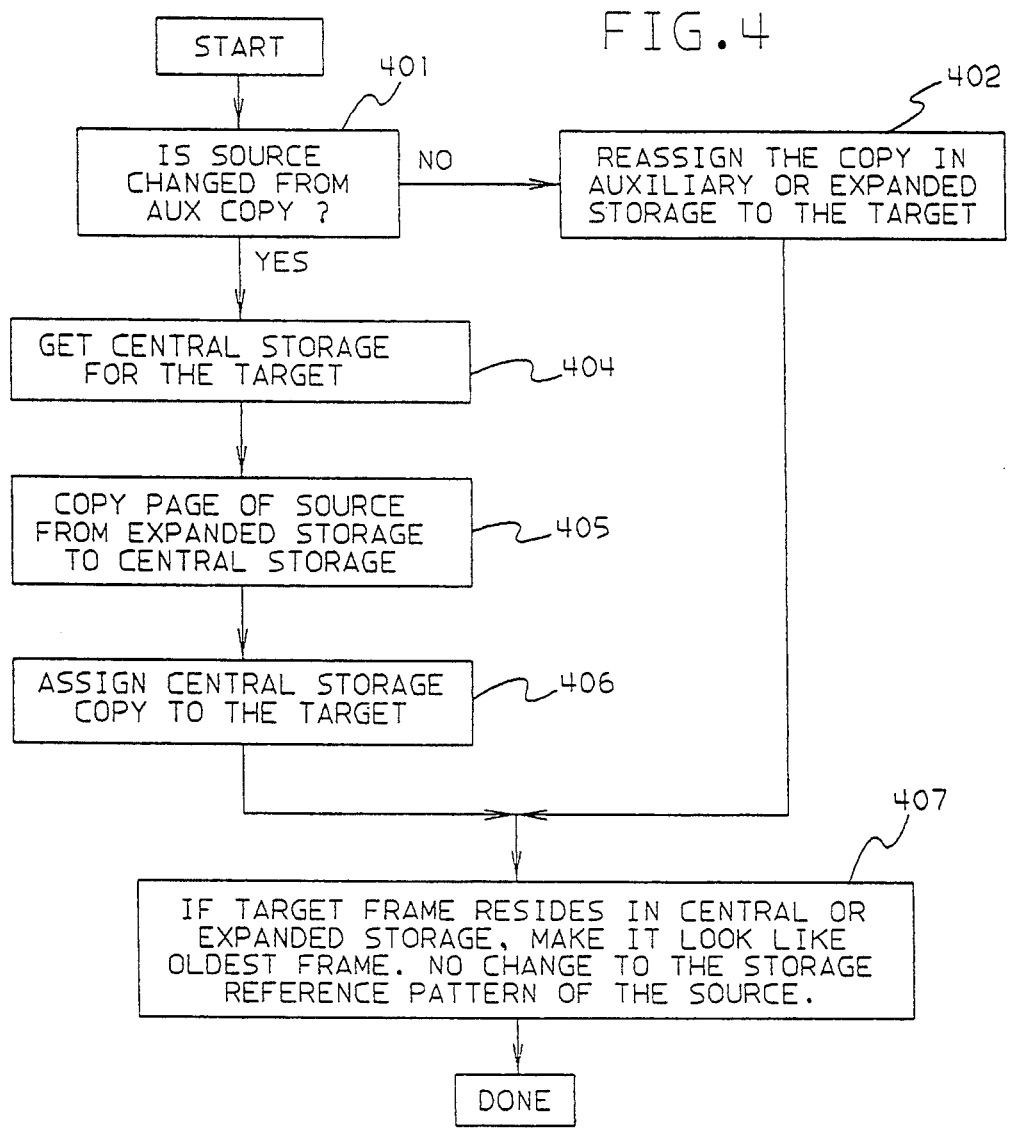
FIG. 4 is an illustration of the RSMCOPY process when a source page resides in expanded storage.

FIG. 4 describes this process.

If the copy of the source page in expanded storage is unchanged from a copy of the page in auxiliary storage (determined in block 401 in FIG. 4), then either the expanded storage copy or the auxiliary storage copy of the source page is assigned to the target page. If the auxiliary storage copy of the source page is assigned to the target page, then the expanded storage copy of the source page is marked as changed (block 402).

FIG. 6 provides more detail on the above process.

If the caller loaded the source into expanded storage, then the target is given the expanded storage copy by updating the external page table for the target page. The external page tables for the source page are updated to indicate the page is no longer in expanded storage, leaving the auxiliary storage copy as the only copy of the source page (block 602).

If the caller did not load the source into expanded storage, then the expanded storage copy is preserved as the source page but it is marked as changed. The auxiliary storage copy of the source page is assigned to the target page by updating the external page table for the target page (giving it the auxiliary copy), and updating the external page table for the source page (removing the auxiliary storage copy) (block 603).

If the copy of the source page in expanded storage is the only copy of the page (which implies that the page in expanded storage has changed from the copy in auxiliary storage), then a central storage frame is allocated for the target page (block 404 in FIG. 4).

The data from the expanded storage copy of the source page is copied to the target page in central storage via the PGIN instruction (blocks 405 and 406 in FIG. 4). Block 407 indicates that artificial aging is performed if the target frame resides in central or expanded storage, and that the storage reference pattern (reference indicator) associated with the source data page is prevented from changing.

EXAMPLE

FIG. 1 and FIG. 7 show results of applying the RSMCOPY methods to a sample set of five (5) pages of source data S1–S5.

Table 1 below contains the set of assumed values for the various controls in the RSM tables and control blocks for the example of source and target pages.

TABLE 1

Sample control values for RSMCOPY Example

| CONTROL | S1 | S2 | S3 | S4 | S5 |
|---|---|---|---|---|---|
| Invalid-cent. | off | off | off | on | off |
| Valid-Estor | off | off | off | off | on |
| Valid-aux | on | on | on | on | on |
| Changed bit | off | on | on | | off |
| Use source as target | off | off | off | off | off |
| Loaded by caller | off | off | off | off | off |
| ESTOR available | | yes | no | | |

The process that determines how the first target page T1 is assigned the first source page S1, is as follows.
1. The source can not be used for the target (block 201).
2. The source does reside in central storage (block 203).
3. The source in central has not been changed since it was loaded from auxiliary storage (block 301).
4. The caller did not load source into central storage (block 501).
5. The auxiliary storage copy of the source is assigned to the target (block 503).

One visualization that results from this last step (block 503), is reflected in FIG. 1 where location A1 of auxiliary storage has been "reassigned" from S1 to T1 (blocks 104A and 104B).

Another visualization that results from this last step (block 503), is reflected in FIG. 7 where, for source page S1, the reference bit and the UIC were not affected by the reassignment (block 702A).

Features

The RSMCOPY service can avoid making multiple copies of a page in central storage. The RSMCOPY service determines if sufficient expanded storage exists to contain the target's copy of the data, rather than make a duplicate copy of it in central storage. If the only copy of the page exists in central storage, RSMCOPY can directly allocate a frame of expanded storage and move the data to expanded storage using the PAGEOUT instruction. The copy of the page on expanded storage can be used as the target copy of the page. Assuming that the target copy of the page would eventually be paged out (using existing algorithms), this technique avoids both a page fault on the target space page and the MVCL to move the data into it. Since no additional central storage frame is required for this technique, demand on central storage is also minimized. Conversely, when the page exists in expanded storage, a central storage frame can be allocated and a PAGEIN instruction used to move data into the central storage frame. In this case, the technique avoids page faults in both the source page being copied and the target page as well as avoiding the MVCL of the data into the target page (as compared to existing techniques).

The RSMCOPY service can in many cases copy data using only a single central storage frame. If the only copy of the page exists in central storage, RSMCOPY can directly allocate a frame of expanded storage and move the data to expanded storage using the PAGEOUT instruction, as described above. Since no additional central storage frame is required for this technique, demand on central storage is also minimized. Conversely, when the page exists on expanded storage, a central storage frame can be allocated and a PAGEIN instruction used to move data into the central storage frame, again requiring only one central storage frame. In situations where RSMCOPY must make a duplicate copy of the page in central storage, RSMCOPY can write that copy of the data to auxiliary storage or expanded storage (depending on the demand for expanded storage), thereby freeing central storage as soon as possible. Or, it can resort to the normal process of letting RSM steal the page when it needs to meet the demands for central storage.

The invention claimed is:

1. In a data processing system comprising an auxiliary storage, a processor storage having a central storage and an expanded storage with a portion of said processor storage defining a real storage, a virtual storage operating system having a real storage manager system service for managing said real storage, and a network of control blocks identifying the physical location of virtual data pages in a virtual storage comprised of said auxiliary storage and said real storage portion of said processor storage, a method of copying a source range of data pages, comprising one or more source data pages located in said virtual storage, to a target range of data pages, comprising one or more target data pages located in said virtual storage, said method comprising the steps of: determining the location and status of said one or more source data pages and reassigning a backing page, backing one of said one or more source data pages, from said source range of data pages to said target range of data pages, wherein said steps of determining and reassigning are performed by said real storage manager system service, said real storage manager system service managing the backing of data through said network of control blocks.

2. The method of claim 1 further comprising the step of preventing the copying from changing a reference indicator associated with any of said one or more source data pages.

3. The method of claim 1 further comprising the step of artificially aging the reassigned backing page in said target range of data pages if the reassigned backing page is in said processor storage.

4. The method of claim 3 further comprising the step of preventing the copying from changing a reference indicator associated with any of said one or more source data pages.

5. The method of claim 1 in which the step of reassigning the backing page further comprises the step of testing whether a requestor of the copying has authorized use of said source range of data pages as said target range of data pages.

6. The method of claim 5 further comprising the step of artificially aging the reassigned backing page if said reassigned backing page is in processor storage.

7. The method of claim 6 further comprising the step of preventing the copying from changing a reference indicator associated with any of said one or more source data pages.

8. The method of claim 1 in which the step of reassigning the backing page further comprises tile step of testing whether said one of said one or more source pages is in auxiliary storage and, if in auxiliary storage, reading the backing page into central storage from auxiliary storage and then reassigning the backing page in priority order: first from a duplicate of said one of said one or more source pages, said duplicate located in one of central storage for and auxiliary storage; second, directly from an expanded storage version of said one of said one or more source pages created by a move of said one of said one or more source pages from central storage to expanded storage; third, directly by a move from said one of said one or more source pages in said target range.

9. The method of claim 8 further comprising the step of artificially aging the reassigned backing page if the reassigned backing page is in processor storage.

10. The method of claim 9 further comprising the step of preventing the copying from changing a reference indicator associated with any of said one or more source data pages.

11. The method of claim 1 in which the step of reassigning said backing page further comprises the step of testing whether said one of said one or more source pages is in central storage and, if in central storage, reassigning the backing page in priority order: first, from a duplicate of said one of said one or more source pages, said duplicate located in one of central and auxiliary storage; second, directly from an expanded storage version of said one of said one or more source pages created by a move or said one or said one or more source pages from central to expanded storage; third directly by a move from said one of said one or more source pages to said target range.

12. The method of claim 11 further comprising the step of artificially aging the reassigned backing page if the reassigned backing page is in processor storage.

13. The method of claim 12 further comprising the step of preventing the copying from changing a reference indicator associated with any of said one or more source data pages.

14. The method of claim 1 in which the step of reassigning the backing page further comprises the step of testing whether said one of said one or more source pages is in expanded storage and, if in expanded storage, reassigning the backing page in priority order: first, from a duplicate of said one of said one or more source pages, said duplicate located in auxiliary storage; second, assigning directly from a central storage version created by a move of said one of said one or more source pages from expanded to central storage.

15. The method of claim 14 further comprising the step of artificially aging the reassigned backing page if the reassigned backing page is in processor storage.

16. The method of claim 15 further comprising the step of preventing the copying from changing a reference indicator associated with any of said one or more source data pages.

17. In a data processing system comprising an auxiliary storage, a processor storage having a central storage and an expanded storage with a portion of said processor storage defining a real storage, a virtual storage operating system having a real storage manager system service for managing said real storage, and a network of control blocks identifying the physical location of virtual data pages in a virtual storage comprised of said auxiliary storage and said real storage portion of said processor storage, a method of copying a source range of data pages, comprising one or more source data pages located in said virtual storage, to a target range of data pages, comprising one or more target data pages located in said virtual storage, said method comprising the steps of:

a) determining a location and state of said one or more of said source data pages;

b) reassigning a backing page, backing one of said one or more source data pages, from said source range of data pages to said target range of data pages;

c) testing whether said one of said one or more source pages is in said central storage and, if in central storage, reassigning the backing page in priority order: first, from a duplicate of said one of said one or more source pages, said duplicate located in one of central storage and auxiliary storage; second, from an expanded storage version of said one of said one or more source pages created by a move of said one of said one or more source pages from central storage to expanded storage; third, by a move from said one of said one or more source pages to said target range;

d) testing whether said one of said one or more source pages is in expanded storage and, if in expanded storage, reassigning the backing page in priority order: first, from a duplicate of said one of said one or more source pages, said duplicate located in auxiliary storage; second, directly from a central storage version created by a move of said one of said one or more source pages from expanded to central storage;

e) testing whether said one of said one or more source pages is in auxiliary storage and, if in auxiliary storage, reading the backing page into central storage from auxiliary storage and then reassigning the backing page in priority order: first from a duplicate of said one of said one or more source pages, said duplicate located in one of central storage and auxiliary storage; second, directly from an expanded storage version of said one of said one or more source pages created by a move of said one of said one or more source pages from central storage to expanded storage; third, directly by a move from said one of said one or more source pages in said target range;

f) artificially aging the reassigned backing page if the reassigned backing page is in processor storage;

g) preventing the copying from changing a reference indicator associated with any of said one or more source data pages, wherein said steps a) through g) are performed by said real storage manager system service, said real storage manager system service managing the backing of data through said network of control blocks.

18. A virtual storage system having an apparatus for copying a source range of data pages, comprising one or more source data pages located in a virtual storage, to a target range of data pages, comprising one or more target data pages located in said virtual storage, said system comprising:

a) a virtual storage data processing system having real storage;

b) a real storage manager (RSM) capable of executing in said data processing system for managing said real storage, said real storage manager having page table means for associating virtual storage pages with backing pages, and also having a copy means for copying said source range of data pages, said copy means comprising means for reassigning one or more backing pages, backing one or more backing pages within said source range of data pages to said target range of data pages.

19. The apparatus of claim 18 in which said copy means further comprises means for artificially aging the reassigned one or more backing pages in said target range of data pages.

20. The apparatus of claim 19 in which said copy means further comprises means for preventing the copying from changing a reference indicator associated with any of said one or more source data pages.

* * * * *